PHOSPHOR STRIP TYPE COLOR TELEVISION TUBE SCANNING SYSTEM

Filed Dec. 15, 1953

INVENTORS.
HENRY H. SCHMALZ.
EDWARD K. NOVAK.
BY Alden D. Redfield
Norman J. O'Malley
ATTORNEYS.

United States Patent Office 2,848,530

Patented Aug. 19, 1958

2,848,530

PHOSPHOR STRIP TYPE COLOR TELEVISION TUBE SCANNING SYSTEM

Henry H. Schmalz, West Chicago, and Edward K. Novak, Batavia, Ill., assignors to Avco Manufacturing Corporation, Cincinnati, Ohio, a corporation of Delaware Application December 15, 1953, Serial No. 398,280

4 Claims. (Cl. 178—5.4)

Figure 1:
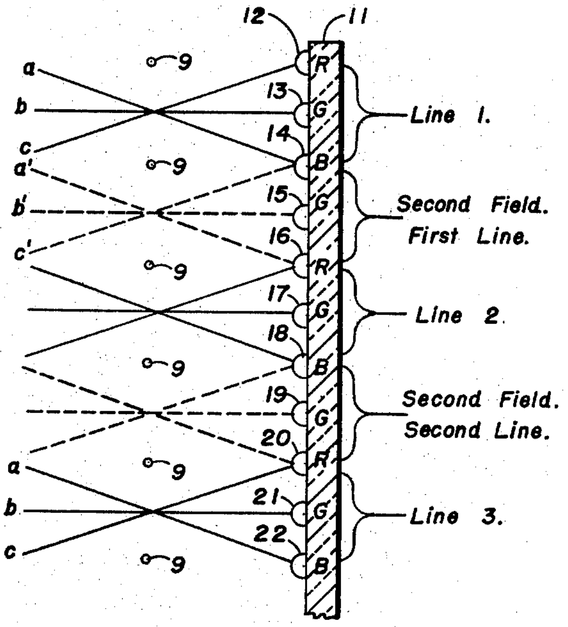

This invention relates generally to cathode-ray tubes for use in color television systems and more particularly to the type of tricolor cathode-ray tube having an image screen composed of primary color phosphor strips alternately arranged.

In the phosphor strip type of color tube, resolution is seldom limited by the number of signal scanning lines. Usually either the horizontal resolution or the vertical resolution is dependent upon the number of phosphor strips used in the image screen. Thus, if the axes of the phosphor strips are positioned parallel to the horizontal axis of the screen, then vertical resolution suffers with any limitation on the available number of phosphor strips. Likewise, if the axes of the phosphor strips lie parallel to the vertical axis of the image screen, then the horizontal resolution is directly related and limited by the number of phosphor strips utilized in the image screen.

In phosphor strip color type cathode-ray tubes which utilize a color selecting grid immediately adjacent the image screen, this aforementioned lack of resolution has been overcome, at least in part, by using one or more of the color strips in each sequence to convey image information in two adjacent scanning lines. For example, the blue strip may be so positioned as to lie in an area common to two adjacent scanning lines. Thus, in a dual-interlaced system, each blue line is energized in successive fields, first for one scanning line and in the next field for the immediately adjacent scanning line.

In phosphor strip color type cathode-ray tubes which utilize a direction-sensitive arrangement for color selection, little, if any, work has been done to improve the resolution by assigning to single color strips the task of conveying information in two adjacent scanning lines. Heretofore it has been considered necessary to provide three primary color strips for each scanning line, making image resolution entirely dependent upon the maximum number of color strips into which the image screen can be divided.

Thus, it becomes a general object of this invention to decrease the number of phosphor strips required in a direction-sensitive type of color cathode-ray translating device.

It is a further object of this invention to provide a direction-sensitive color strip screen type cathode-ray translating device having an electron stream modulated so as to utilize certain phosphor strips to convey information in more than one scanning line.

Briefly, the invention comprises a direction-sensitive type of tri-color cathode-ray tube having a shadow masking grid which may or may not supply post-deflection focusing, and an image screen positioned adjacent thereto which is provided with a plurality of phosphor color strips in parallel configuration placed in a plane normal to the central undeflected electron beam position. Alternate phosphor strips on the image screen are of a given primary color with alternate gaps between these phosphor strips of the given primary color being substantially filled with phosphor strips of a second primary color and the remaining gaps being filled with phosphor strips of the third primary color.

Means are also provided for developing an electron stream which approaches the image screen in such a manner as to have three separately modulatable components lying in a plane normal to the image screen, each component being at an angle with each other component. In other words, each electron stream component approaches the image screen from a different direction. Further means are provided for modulating these three electron stream components with video signal primary color values in such a manner that the modulated stream component of one selected color strikes the screen from a relatively constant angle, while the two remaining stream components are modulated, through means operating at the field frequency rate, alternately and separately by each of the two remaining primary color signal values.

Figure 2:
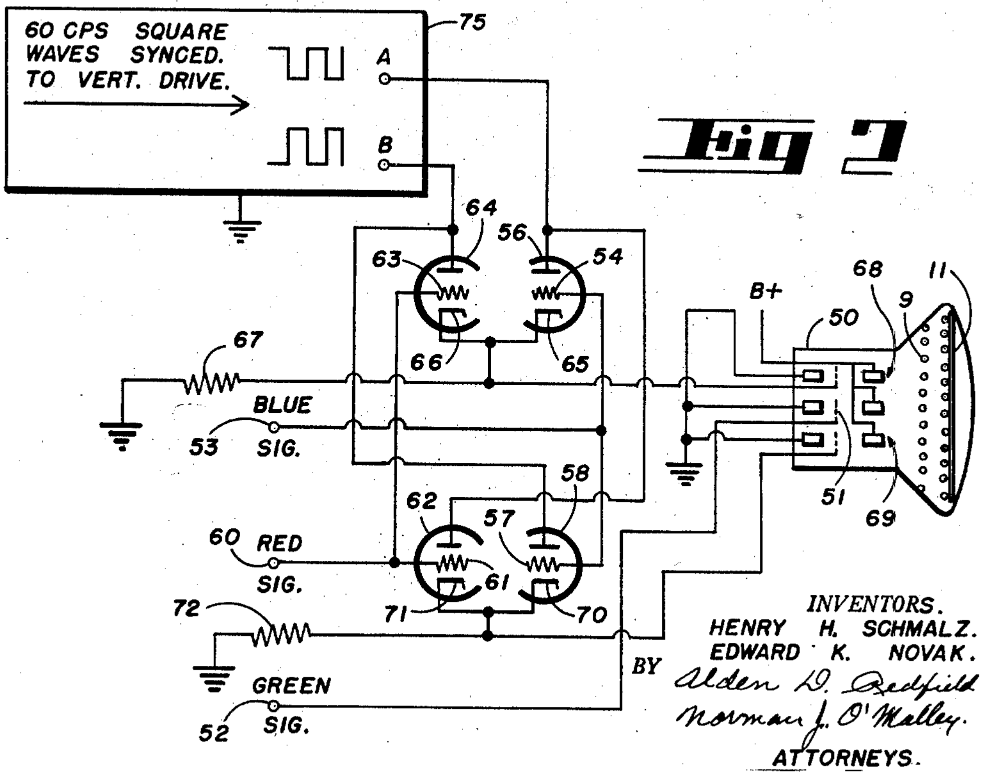

For a better understanding of the present invention, together with other and further objects, advantages and capabilities thereof, reference is made to the following disclosure and appended claims in connection with the accompanying drawings, in which:

Fig. 1 is a schematic figure showing the image screen configuration and electron stream approach directions; and Fig. 2 illustrates the input circuit switching means.

Fig. 1 is a schematic cross section of a transparent screen and a shadow masking grid, in accordance with one embodiment of the invention, to be used in a cathode-ray translating device for producing color images. Transparent screen 11 may be either made of glass or other suitable material and inserted in a cathode-ray tube glass or metal envelope, or it may comprise the relatively flat inside screen surface of a cathode-ray tube envelope viewing face, per se. Fluorescent strips or lines comprising phosphors capable of emitting light of selected colors under the impact of an electron beam, are placed on the electron gun side of screen 11. Though in Fig. 1 these strips, i. e., strips 12 through 22, are shown as relatively widely spaced, in actual practice minimum spacing must be used for optimum resolution.

As can be seen in the figure, each strip is labeled to indicate the assigned light-emitting property. For example, strip 12 is labeled with an R, indicating that this strip emits red light when bombarded by an electron stream. Strip 13, as indicated, emits green light, and strip 14 emits blue light under bombardment. The order or color sequence of the phosphor strip configuration is of extreme importance.

Alternate strips, namely, strips 13, 15, 17, 19, 21, etc., the complete screen not being shown, are all of the same color in this case, green. Though it is important that alternate strips be assigned one given primary color, it is not necessary that this color be green; it might be any other suitable primary color, preferably the predominant primary color found in the objects whose images are to be transmitted. The gaps between the alternate strips of the given primary color are filled with strips of the two remaining primary colors in such manner as to position each green strip or alternate strip between a strip of the second primary color and a strip of the third primary color. Thus, each green strip is bordered on one side by a blue strip and on the other side by a red strip. The number of green strips, or phosphor strips of the selected dominant primary, should be the same as the number of useful scanning lines in each frame which carries video information.

Shadow mask or focusing grid 9 may comprise a wire structure comprising a plurality of parallel wires placed adjacent and parallel to the plane of the phosphor strips, each grid wire being positioned opposite each color strip of the second and third primary colors. Each alternate strip, or green strip, as shown in Fig. 1, is positioned between two grid wires.

Lines *a*, *b*, and *c*, in Fig. 1, represent components of an electron stream used to scan the color strips on plate 11. Each stream component, e. g., stream component *a*, may originate from either a separate electron gun or the same electron gun which supplies the other electron stream components, viz., stream component *b* and stream component *c*. In other words, stream components *a*, *b*, and *c* may originate from either a single gun spun beam source, well known to the art, which approaches the image screen from different directions at different instants, or a three-gun unit, whichever may be preferred.

The spacing between grid wires 9 may be the same as the spacing between alternate phosphor strips on screen 11 but this need not be the case, especially in wide deflection angle tubes using a post-deflection focusing potential between the grid structure and a metallic backing, such as aluminum covering the electron gun side of the phosphor strips. Since post deflection focusing forms no part of the invention, the phosphor screen is not shown as being metallic coated, but it is to be noted that the invention may be used in such units.

As can be seen in Fig. 1, though the approach angles are exaggerated for purposes of illustration, line 1 of the image is supplied by bombardment of phosphor strips 12, 13, and 14 with modulated electron stream components *c*, *b*, and *a* respectively. Line 2, in the dual-interlaced system which is presently conventional and shown, comprises phosphor strips 16, 17, and 18. Symmetrically, line 3 comprises phosphor strips 20, 21, and 22. It should be understood that the illustration of Fig. 1 represents only a small portion of the image screen, the remainder of the screen being symmetrically similar.

The first line of the second interlaced field includes blue strip 14, which is also common to line 1, and red strip 16, which is also common to line 2. In similar manner, the second line of the second field uses blue strip 18, which is also common to line 2 of the first field, and red strip 20, which is common to line 3 of the first field.

Thus, it can be seen that all strips of the second and third primary colors, viz., red and blue strips, are utilized to convey information in two adjacent scanning lines, the first scanning line being in the first field and the adjacent line being in the second field.

In line 1 of the first field, electron stream *a* is directed toward the image screen downwardly through the plane of the shadow mask or focusing grid so as to bombard the blue phosphor strip 14. Stream component *c* on the other hand, is directed toward the image screen from a relatively different direction, driving upwardly through the plane of the shadow mask to strike the red phosphor strip 12. Electron stream component *b* is directed toward the screen on a path having a component substantially normal to the plane of the screen. Thus, stream component *b* drives straight through the opening provided between the grid wires to strike the dominant color phosphor strip or green strip in the case illustrated, which is positioned between phosphor strips 12 and 14. As has been stated, the approach angle of the electron stream has been exaggerated, in Fig. 1, for the purposes of illustration. In actual practice the approach angle degree is governed primarily by the width of the phosphor strips, the angle through which the electron stream is deflected after it leaves the gun, and the degree of post-deflection focusing when used in such type tube.

The same electron stream approach direction is obtained in similar manner in the remainder of the lines of the first field. In all cases the electron stream *a* approaches downwardly to bombard the blue phosphor lines, and the electron stream *c* drives upwardly through the plane of the shadow mask to strike the red phosphor lines or strips. Electron stream component *b* also continues to have a path component which is normal to the plane of the image screen. Thus, the dominant color or green strips are always excited by this portion of the electron stream.

As far as the electron stream approach directions are concerned, it makes little difference whether or not a single spun or offset electron beam is used or whether three distinct beams, each originating from a different gun structure, are used. In both cases color signal modulated or "color tagged" electrons approach the screen from a direction governed by the assigned modulation color information.

In the first line of the second field it becomes necessary to interchange the color signal modulation of the electron stream components *a* and *c* in order to utilize the assigned color strip sequence without introducing color error.

This is shown in Fig. 1, where the second field electron stream components are indicated with a prime symbol to distinguish them from the electron stream components of the first field. Stream component *a'* of the second field is directed downwardly through the plane of the shadow mask grid to impinge upon red strip component 16, which is also used to convey information in line 2 of the first field. Similarly, stream component *c'* of the second field is directed upwardly through the plane of the shadow mask grid to impinge on blue phosphor strip 14, which is also used to convey information in line 1 of the first field. The central stream component *b'* drives through the opening provided between the grid wires to strike the dominant color grid phosphor strip in much the same manner as stream component *b* in line 1 of the first field. In other words, in the second field two of the electron stream direction components, viz., the *a'* component and the *c'* component, are directed towards color strips which emit light of different color from the strips upon which these electron stream direction components impinged in the first field. As can be seen, the *a* components in the first field always impinge upon blue strips, such as phosphor strip 14, while the *c'* components in the second field are used to impinge upon the blue phosphor strips. Likewise, the *c* electron stream components impinge on red phosphor strips in the first field while the *a'* components impinge on the red phosphor strips in the second field.

A circuit for providing the required switching between modulating signals for the *a* and *c* electron stream components is shown in Fig. 2 having an output coupled to a plural gun cathode-ray translating device 50. The electron gun or source in cathode-ray translating device 50 supplying the electron stream component which ultimately impinges upon the dominant color, or green phosphor strips, includes a modulating electrode 51 which is connected directly to a source of video signals, taken from terminal 52, supplying green chrominance information. Video signals supplying blue chrominance information are taken from terminal 53 and fed to the grid 54 of switching tube 56 and to grid 57 of switching tube 58. In symmetrical fashion, video signals supplying the red chrominance information are taken from terminal 60 and fed to grid 61 of switching tube 62 and also to grid 63 of switching tube 64.

The cathodes 65 and 66 of tubes 56 and 64, respectively, are connected together through resistor 67 to ground. Similarly, cathodes 70 and 71 of switching tubes 58 and 62, respectively, are connected through resistor 72 to ground.

Anode potential for the switching tubes is supplied from the pulse source 75 which provides substantially square-wave pulses at the field frequency rate in synchronism with the vertical sync pulses included in the receiver input composite video signal. As shown in Fig. 2 in the block designated 75, these rectangular pulses may be taken from a vertical deflection drive circuit or synchronized with the output of the vertical deflection drive circuit.

The circuit of Fig. 2 functions to alternate the modulation of two of the electron guns included in the video translating device 50 in much the same manner as a double-throw, double-pole switch, except that the action is electronic in nature rather than mechanical. For example, the anode voltage for tubes 56 and 58 is taken from source 75, tube 56 being supplied from terminal A and tube 58 being supplied from terminal B. As shown by the wave form in the box 75, terminal A is always positive when terminal B is negative, relative to ground. Also, terminal B is always positive when terminal A is negative, relative to ground.

When terminal A of unit 75 goes positive, relative to ground, the blue chrominance signals impressed on grid 54 of tube 56 modulate the resulting electron flow through the anode-cathode path of tube 56 and cathode load resistor 67. The resulting output signal is taken from across resistor 67 to modulate the electron stream component emitted from upper gun 68 in cathode ray translating device 50.

During this portion of the cycle, tube 58 is cut off because of the negative potential relative to ground impressed on its anode from terminal B, and the blue chrominance signals impressed on grid 57 of this tube have no effect on current flow through the remainder of the circuit. Since the anode of tube 62 is also connected to terminal A of unit 75, this tube also conducts at the instant in question, and the resulting electron flow therein is modulated by the red chrominance signals supplied to grid 61 from terminal 60. The output signal across cathode resistor 72 is fed to the lower gun 69 of cathode-ray translating device 50 to modulate the electron stream component provided by this gun. Tube 64, which is also cut off because of the negative potential on terminal B at this instant stops the red chrominance signals impressed on grid 63 from having any effect on the current flow through cathode resistor 67.

At the start of the second scanning field, terminal B is driven positive, relative to ground, and terminal A is driven negative, relative to ground, by the vertical deflection drive circuit. As a result, the electron double-throw, double-pole switch is thrown into its second or alternate position. Thus, only tubes 58 and 64 are supplied with positive anode potential, tubes 56 and 62 being cut off by the negative potential on terminal A. As a result, the blue chrominance signals which formerly were impressed on gun 68 of cathode-ray translating device 50 are impressed across resistor 72 and fed to gun 69. In similar fashion, red chrominance signals, which formerly were impressed upon gun 69, are amplified in switching tube 64 and impressed on gun 68 from cathode resistor 67.

The chrominance signals carrying green information always modulate the electron stream component emitted from the center gun in cathode-ray translating device 50 and thus always approach the image screen from the same direction. However, since electron gun 68 supplies a stream component which approaches the image screen from a set direction different than the fixed approach direction of the stream component emitted by gun 69, it is seen that the circuit of Fig. 2 provides means for "tagging" two of the electron stream components in accordance with the sequence necessary to provide the color selection shown in Fig. 1.

The foregoing description of the invention has assumed the availability of an accurate deflection system for maintaining fine scanning control of the electron stream components. Though the deflection system forms no part of the invention it may be necessary, in some installations, to provide additional control over the electron stream components in order to maintain the essential scanning beam registration. Thus, it may become necessary to utilize the present invention in conjunction with structures of a nature similar to that disclosed in the United States Patent 2,621,244 which issued on December 9, 1952. It is to be understood that other types of registration control or deflection control may be used, the only criterion being that each electron stream component must be confined to the three color phosphor strips under scansion at any one instant. In other words, the electron stream components, while scanning line 1 and impinging upon phosphor strips 12, 13, and 14, must not be allowed to spill over so as to also strike other phosphor strips, such as strips 15, 16, and 17.

While there has been shown and described what is at present considered to be the preferred embodiment of the present invention, it will be obvious to those skilled in the art that various changes and modifications may be made therein without departing from the appended claims.

Having thus described our invention, we claim:

1. In a color television system, the combination comprising a cathode-ray video signal translating device of the direction-sensitive type having a masking element and an image screen positioned adjacent thereto, said image screen comprising a plurality of parallel phosphor strips of which alternate strips fluoresce to emit light of a given primary color, each of said alternate fluorescent strips being bordered on one side by a parallel fluorescent strip which emits light of a second primary color and bordered on the other side by a parallel fluorescent strip which emits light of a third primary color, a source of derived video signals having separate chrominance component values representing each of the three primary colors, means including three control electrodes in said signal translating device for developing a modulatable electron stream having three components, each component of which approaches said image screen from a direction different from the approach direction of the two other stream components, with one electron stream component approaching on a path between the paths of the two other stream components, means for modulating said one electron stream component with derived video signals of the given primary color and for modulating each of the two other electron stream components with a separate one of the video signal second and third primary color components, and switching means connected to two of said control electrodes and operating at the field frequency rate for interchanging the modulation signals of the two electron stream components modulated by the second and third primary color components.

2. In a color television system, the combination comprising a cathode-ray video signal translating device of the direction-sensitive type having a shadow masking wire grid and an image screen positioned adjacent thereto, said image screen comprising a plurality of parallel phosphor strips of which alternate strips fluoresce to emit light of a given primary color, each of said alternate fluorescent strips being bordered in spaced relationship on one side by a parallel fluorescent strip which emits light of a second primary color and bordered in spaced relationship on the other side by a parallel fluorescent strip which emits light of a third primary color, a source of derived video signals having separate chrominance component values representing each of the three primary colors, means including three control electrodes in said signal translating device for developing a modulatable electron stream having three components, each component of which approaches said image screen from a direction different from the approach direction of the two other stream components, with one electron stream component approaching on a path between the paths of the two other stream components, means for modulating said one electron stream component with derived video signals of the given primary color and for modulating each of the two other electron stream components with a separate one of the video signal second and third primary color components, and electronic means connected directly to two of said control electrodes and operating at the field frequency rate for interchanging the modulation signals of the two electron stream components modulated by the second and third primary color components.

3. In a color television system, the combination comprising a cathode-ray video signal translating device of the direction-sensitive type having a shadow mask and an image screen positioned adjacent thereto, said image screen being coated with a plurality of parallel phosphor strips of which alternate strips fluoresce and emit light of a given primary color, each of said alternate fluorescent strips being bordered on one side by a parallel fluorescent strip which emits light of a second primary color and bordered on the other side by a parallel fluorescent strip which emits light of a third primary color, a source of derived video signals having chrominance component values divided into three primary colors, means including three control electrodes in said signal translating device for developing three separately modulatable electron streams, each of which electron streams approaches said image screen from a direction different from the approach direction of the two other electron streams, with one electron stream approaching on a path between the paths of the two other stream components, means for modulating said one electron stream with derived video signals of the given primary color and for modulating each of the two other electron streams with a separate one of the video signal second and third primary color components, and switching means connected directly to two of said control electrodes and operating at the field frequency rate for interchanging the signals modulating the said two other electron streams.

4. In a color television system, the combination comprising a cathode-ray video signal translating device of the direction-sensitive type having a wire shadow masking grid and an image screen positioned adjacent thereto, said image screen being coated with a plurality of parallel phosphor strips of which alternate strips fluoresce and emit light of a given primary color, each of said alternate fluorescent strips being bordered on one side by a parallel fluorescent strip which emits light of a second primary color and bordered on the other side by a parallel fluorescent strip which emits light of a third primary color, a source of derived video signals having chrominance component values divided into three primary colors, means including three control electrodes in said signal translating device for developing three separately modulatable electron streams, each of which electron streams approaches said image screen from a direction different from the approach direction of the two other electron streams, with one electron stream approaching on a path between the paths of the two other stream components, means for modulating said one electron stream with derived video signals of the given primary color and for modulating each of the two other electron streams with a separate one of the video signal second and third primary color components, and switching means connected directly to two of said control electrodes and operating at the field frequency rate for interchanging the signals modulating the said two other electron streams.

References Cited in the file of this patent

UNITED STATES PATENTS

| | | |
|---|---|---|
| 2,466,791 | Schroeder | Aug. 10, 1948 |
| 2,568,448 | Hansen | Sept. 18, 1951 |
| 2,595,548 | Schroeder | May 6, 1952 |
| 2,736,859 | Pritchard | Feb. 28, 1956 |

---

UNITED STATES PATENT OFFICE

CERTIFICATE OF CORRECTION

Patent No. 2,848,530 August 19, 1958

Henry H. Schmalz et al.

It is hereby certified that error appears in the printed specification of the above numbered patent requiring correction and that the said Letters Patent should read as corrected below.

Column 6, line 43, after "connected" insert -- directly --.

Signed and sealed this 4th day of November 1958.

(SEAL)

Attest:

KARL H. AXLINE

Attesting Officer

ROBERT C. WATSON

Commissioner of Patents

UNITED STATES PATENT OFFICE
CERTIFICATE OF CORRECTION

Patent No. 2,848,530 August 19, 1958

Henry H. Schmalz et al.

It is hereby certified that error appears in the printed specification of the above numbered patent requiring correction and that the said Letters Patent should read as corrected below.

Column 6, line 43, after "connected" insert -- directly --.

Signed and sealed this 4th day of November 1958.

(SEAL)

Attest:

KARL H. AXLINE

Attesting Officer

ROBERT C. WATSON

Commissioner of Patents